United States Patent
Funazaki et al.

(10) Patent No.: US 6,400,505 B1
(45) Date of Patent: *Jun. 4, 2002

(54) REAR PROJECTION IMAGE DISPLAY APPARATUS INCLUDING LIGHT EXIT SURFACE CONFIGURED TO REDUCE NOISE

(75) Inventors: Kazuo Funazaki, Nakajho-machi; Ichiro Matsuzaki, Tokyo, both of (JP)

(73) Assignee: Kuraray Co., Ltd., Kurashiki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,951

(22) Filed: Feb. 26, 1998

(30) Foreign Application Priority Data

Feb. 28, 1997 (JP) ............................................. 9-045633

(51) Int. Cl.⁷ ............................................... G03B 21/60
(52) U.S. Cl. ...................................................... 359/456
(58) Field of Search ................................ 359/456, 455, 359/453, 460, 619, 620, 621

(56) References Cited

U.S. PATENT DOCUMENTS

| | | | | |
|---|---|---|---|---|
| 2,736,235 A | * | 2/1956 | Toulon ............................ | 88/57 |
| 3,830,556 A | * | 8/1974 | Bratkowski .................. | 350/128 |
| 3,940,788 A | * | 2/1976 | Abe et al. ...................... | 358/43 |
| 4,927,233 A | * | 5/1990 | Nakanishi et al. ........... | 350/128 |
| 5,196,960 A | * | 3/1993 | Matsuzaki et al. ........... | 359/453 |
| 5,359,454 A | * | 10/1994 | Steenblik et al. ............ | 359/463 |
| 5,666,226 A | * | 9/1997 | Ezra et al. .................... | 359/621 |
| 5,870,224 A | * | 2/1999 | Saitoh et al. ................. | 359/456 |
| 6,124,969 A | * | 9/2000 | Funazaki et al. ............. | 359/456 |
| 6,130,777 A | * | 10/2000 | Yamashita et al. ........... | 359/456 |
| 6,147,801 A | * | 11/2000 | Goldenberg et al. ......... | 359/456 |

* cited by examiner

Primary Examiner—Christopher E. Mahoney
(74) Attorney, Agent, or Firm—Oblon, Spivak, McClelland, Maier & Neustadt, P.C.

(57) ABSTRACT

Eliminating occurrence of non-uniform vertical line patterns observable in image display apparatus with its associative projector device having its pixel structure in the horizontal direction. To this end, rear projection image display apparatus includes a screen including a lenticular lens sheet having its light incidence surface on which lenticular lenses (8) are periodically provided and a light exit surface having a substantially flat surface (8) at or near the focal position of each lenticular lens (9) on the light incidence surface. The lenticular lens sheet has a light absorption layer (10) provided in a region different from the focal position. The apparatus also includes a projector device having a periodical pixel structure for projecting an optical image onto the screen, such as liquid crystal display panels or the like. Optionally, one or more micro-lenticular lenses may be provided on the substantially flat surface, which lenses have a periodical structure in the same direction as that of the lenticular lenses on the light incidence surface, wherein the pitch ranges from 0.03 to 0.1 mm where as the lens height measures 0.003 to 0.03 mm.

2 Claims, 6 Drawing Sheets

REAR PROJECTION IMAGE DISPLAY APPARATUS INCLUDING LIGHT EXIT SURFACE CONFIGURED TO REDUCE NOISE

BACKGROUND OF THE INVENTION

1. Field of the Invention

The present invention relates to image display apparatus of the rear projection type having a projector device with a periodical pixel structure including, but not limited to, a liquid crystal display panel and also having a screen for permission of projection of images thereonto from the projector device.

2. Description of the Prior Art

Conventionally, as image projector devices adaptable for use in rear projection image display apparatus, "three-tube" cathode-ray tube (CRT) devices have been widely employed which include three independent tubes for three fundamental colors, such as red (R), green (G) and blue (B). With such three-tube projector, relatively high luminance intensity or brightness is attainable. However, this does not come without accompanying a penalty—the difficulty in meeting light-weight and small-size requirements. In recent years, specific rear projection image display apparatus which employs liquid crystal display panels, digital micro-mirror devices (referred to as the "DMDs" hereinafter) or equivalents thereto is under development in order to reduce the weight and dimension thereof.

In the image display apparatus utilizing the three-tube projector device, one typical screen for use in displaying images is configured from a couple of components—a Fresnel lens sheet, and a lenticular lens sheet as shown in FIG. 7. As shown herein, the lenticular lens sheet has its light incidence surface and light exit surface, on respective ones of which cylindrical or "lenticular" lenses 21, 22 are formed each having a horizontally periodical surface configuration structure, while forming a light absorption layer 23 on selected part of the light exit surface which might be free from collection of light rays as introduced from the lens on the light incidence surface side. Typically, the pitch of lenticular lenses 21, 22 may be greater than or equal to 0.5 mm.

Currently available projector devices including, but not limited to, liquid crystal display panels and DMDs, are designed to have periodical pixel configuration in both the horizontal direction and the vertical direction. In cases where a projector device having such periodical pixel structure is used in combination with the prior known screen for use with three-tube projector devices, a problem of moire generation might arise due to the fact that each of the projector device and lenticular lenses of its associative screen has the horizontal periodic structure.

One approach to avoiding the moire problem has been disclosed, for example, in Published Unexamined Japanese Patent Application No. 2-97991, which is designed so that the ratio of lenticular lens pitch to the horizontal pitch of an image due to liquid crystal display panel pixels is selected to satisfy "$1/(N+\frac{1}{2})$" where N is an integer greater than or equal to 1. According to the teachings, the value of such parameter "N" is typically set at 2 or greater. Supposing that the pitch of a pixel image as projected onto the screen is 1.0 mm, the pitch of lenticular lens satisfying the above formula may be as small as 0.4 mm if N is 2, 0.28 mm for N=3, and 0.222 mm for N=4. In recent years, as the pixel pitch decreases for achievement of demands for higher image display precision and resolution, the pitch of such lenticular lens decreases accordingly.

Use of certain screens designed causing the lenticular lens pitch to meet the ratio discussed above might enable avoidance of moire creation on display screens. Unfortunately, this still suffers from a problem of observability of an unwanted pattern of thin vertical lines on the display screen (such unwanted pattern of thin vertical lines will be referred to as the "non-uniform vertical lines" hereinafter).

Incidentally, one prior known design scheme for numerical determination of the shape of the lenticular lens sheet shown in FIG. 7 has been disclosed for example in Published Unexamined Japanese Patent Application No. 58-221833. With this design scheme, the ratio (d/p1) of the pitch "p1" of lenticular lenses on the light incidence surface side to the thickness "d" of its associated lenticular lens sheet (the distance between one light incidence surface-side lenticular lens and its associative lenticular lens on the light exit surface side) may typically fall within a range of from 1.1 to 1.25 in order to obtain the horizontal-direction screen characteristics required. Accordingly, for purposes of elimination of onscreen moire generation, the need arises to decrease the sheet thickness so that it is as small as 0.44 to 0.5 mm in cases where the lenticular lens pitch p1 is set at 0.4 mm according to the design teachings discussed above.

While the lenticular lens sheet may generally be manufactured by use of optically transparent or light-transmissive thermal irreversible resin materials, a simple decrease in sheet thickness with a decrease in pitch of miniaturized lenticular lenses would result in an increase in difficulty of the manufacture thereof, while simultaneously decreasing the mechanical strength or stiffness of the resultant lenticular lens sheet.

SUMMARY OF THE INVENTION

It is therefore an object of the present invention to provide improved image display apparatus capable of avoiding the problems encountered with the prior art.

It is another object of the invention to provide image display apparatus with an associative projector device having horizontal pixel structures capable of eliminating, or at least greatly suppressing, occurrence of vertical linear on-screen noise patterns including non-uniform vertical lines.

It is another object of the invention to provide image display apparatus of the rear projection type employing a screen of enhanced physical strength.

To attain the foregoing objects the present invention provides specific rear projection image display apparatus which comprises: (1) a screen including a lenticular lens sheet having a light incidence surface with lenticular lens components being periodically provided thereon and a light exit surface having a substantially flat surface at or near the focal position of each lenticular lens on the light incident surface, and also having a light absorption layer provided in a region different from the focal position; and (2) a projector device of the periodical pixel configuration, including an array of pixels as periodically disposed thereon, for projecting images onto the screen.

In accordance with one aspect of the invention, it may be preferable that micro-lenticular lenses are provided on the substantially flat surface, which have a periodical pixel configuration that is similar in direction to that of the lenticular lenses on the light incidence surface, because of the capability of increasing horizontally diffused light rays. More specifically, the micro-lenticular lenses are such that the pitch may range from 0.03 to 0.1 mm and that the lens height falls within a range of from 0.003 to 0.03 mm. In view of the fact that the prior art lenticular lens sheets are typically designed so that the pitch of lenticular lenses ranges from 0.2 to 0.5 mm while the lens height is from 0.03 to 0.08 mm, the micro-lenticular lenses in the lenticular lens sheet of the invention may be clearly distinguishable in this respect over the prior art lenticular lenses on the light exit surface side thereof.

BRIEF DESCRIPTION OF THE DRAWINGS

These and other objects, features and advantages of the invention will be apparent from the following more particular description of preferred embodiments of the invention, as illustrated in the accompanying drawings.

DETAILED DESCRIPTION OF THE INVENTION

Some embodiments of the present invention will now be described with reference to the accompanying drawings in detail below.

Figure 1:
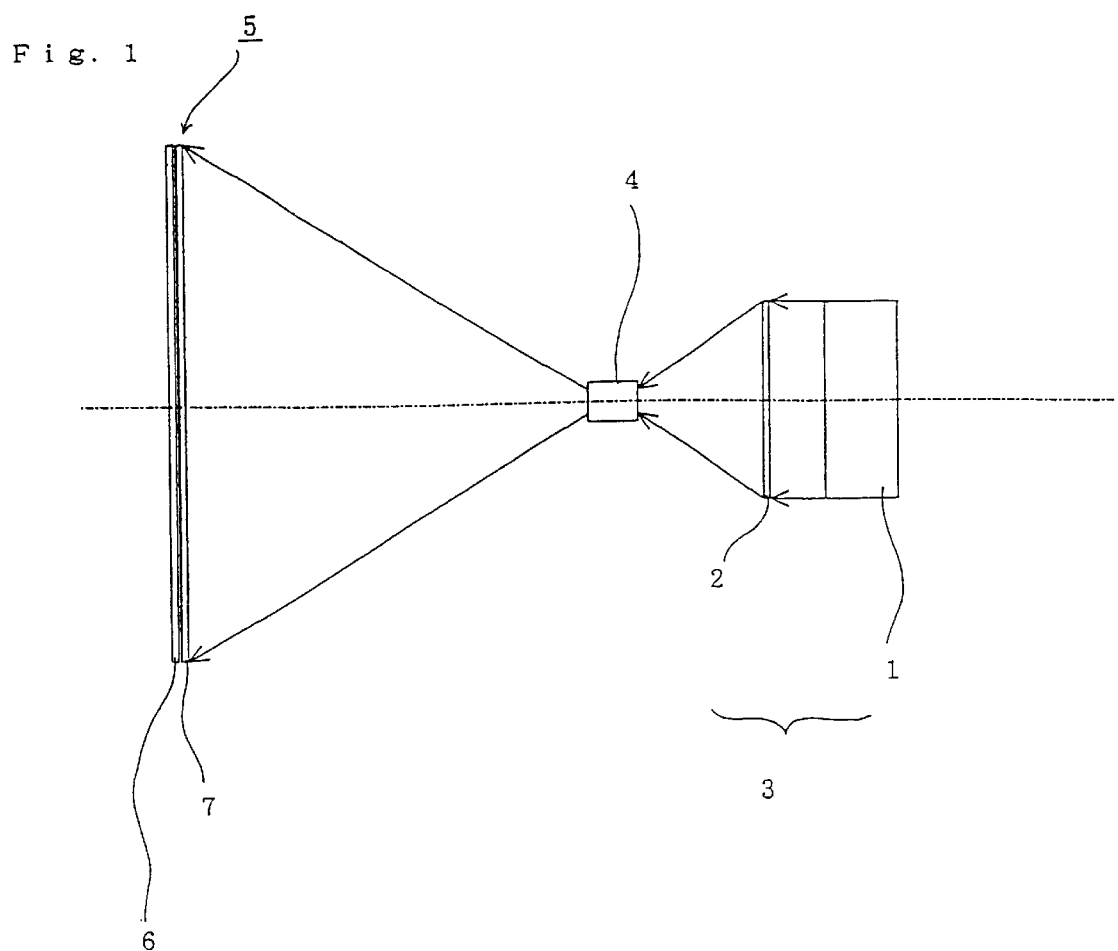
FIG. 1 is a diagram showing one exemplary configuration of rear projection image display apparatus in accordance with one preferred embodiment of the invention.

See FIG. 1, which schematically depicts an overall configuration of rear projection image display apparatus in accordance with one preferred embodiment of the invention. As shown in FIG. 1, this rear projection image display apparatus is constituted from a projector unit 3 which includes a light source 1, and an image display device 2 having a horizontally periodical pixel structure, such as an liquid crystal display panel, DMD or the like, for permitting introduction of light rays from the light source 1 thereonto, a projection lens 4 for enlargedly projecting an optical image from the projector unit 3 onto its associated screen, and a screen 5 allowing viewers or audience to observe images as presently projected from its rear surface side at spaced-apart viewing locations opposing the front surface thereof. This screen 5 may be comprised of two sheets: a lenticular lens sheet 6 and Fresnel lens sheet 7 each having a configuration as will be later explained in conjunction with FIG. 2. Optionally, the screen 5 may alternatively be made of the lenticular lens sheet only, where appropriate.

Figure 2:
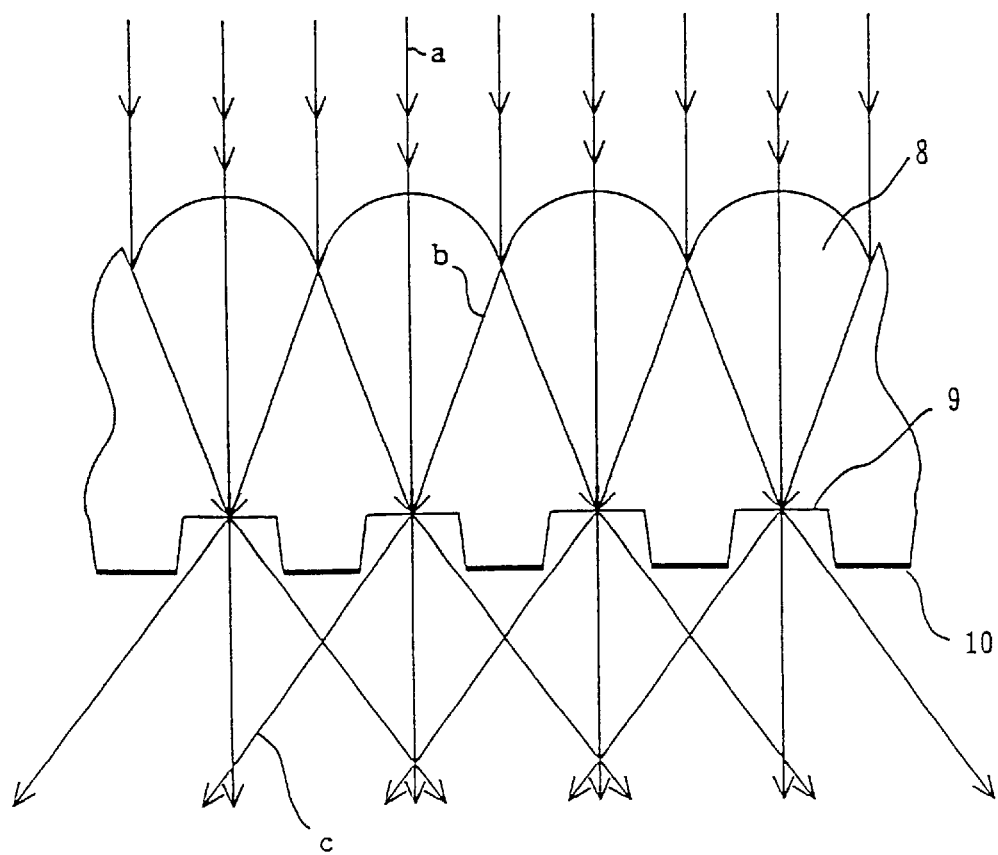
FIG. 2 is a diagrammatic representation of one exemplary configuration of a lenticular lens sheet as used in the apparatus embodying the invention along with a depiction of several major light transmission paths associated therewith.

Referring to FIG. 2, this is a diagrammatic representation for explanation of a schematic configuration of the lenticular lens sheet adaptable for use in the invention, along with several major light transmission paths associated therewith, i.e. the routes along which rays of incident light are expected to travel. The illustrative lenticular lens sheet has its light incidence surface on which a plurality of lenticular lens components 8 are defined periodically, and a light exit surface on which substantially flat surface portions 9 and light absorption layers 10 are alternately provided defining a stripe-like pattern while locating the former at a level substantially identical to the focal position of each lenticular lens 8. Use of such light absorption layer strips 10 may increase the contrast of a projected image with respect to environmental or external light.

Figure 7:
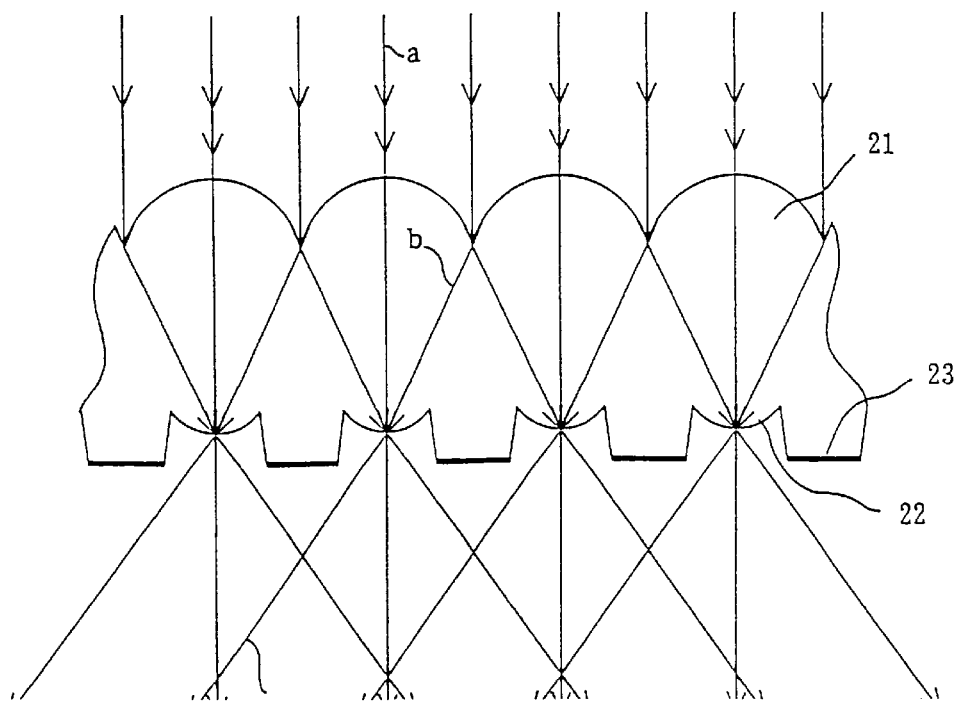
FIG. 7 is a diagrammatic representation of one typical configuration of the prior art lenticular lens sheet along with light paths shown therein.

An explanation will now be given of the reason why unwanted "non-uniform vertical line" noise patterns can take place in prior art lenticular lens sheets and the reason why such non-uniform vertical line occurrence problem may be avoidable by use of the lenticular lens sheet embodying the principles of the present invention, with reference to FIGS. 2 and 7, wherein FIG. 2 depicts the lenticular lens sheet used in the invention whereas FIG. 7 shows one typical conventional lenticular lens sheet.

The reason why such non-uniform vertical line patterns can occur in the prior known lenticular lens sheet may be explained in a way which follows. As shown in FIG. 7, a plurality of continuous lenticular lenses 21 having a horizontal periodic structure are formed on the light incidence surface side of the conventional lenticular lens sheet, while lenticular lenses 22 are formed on its light exit surface side at or near the focal position of the lenticular lenses on the light incidence side. Additionally, a stripe pattern of light absorption layers 23 is formed at a level that corresponds to one non-focal position. Light rays as projected from the light incidence surface side (designated by the reference character "a" in FIG. 7) are collected or condensed (rays "b") by the incidence surface-side lenticular lenses 21 onto the lenticular lens sheet then reaching the exit surface-side lenticular lenses 22. These rays are horizontally diffused through the exit surface-side lenticular lenses 22 for exit toward the outside (rays "d").

Figure 8:
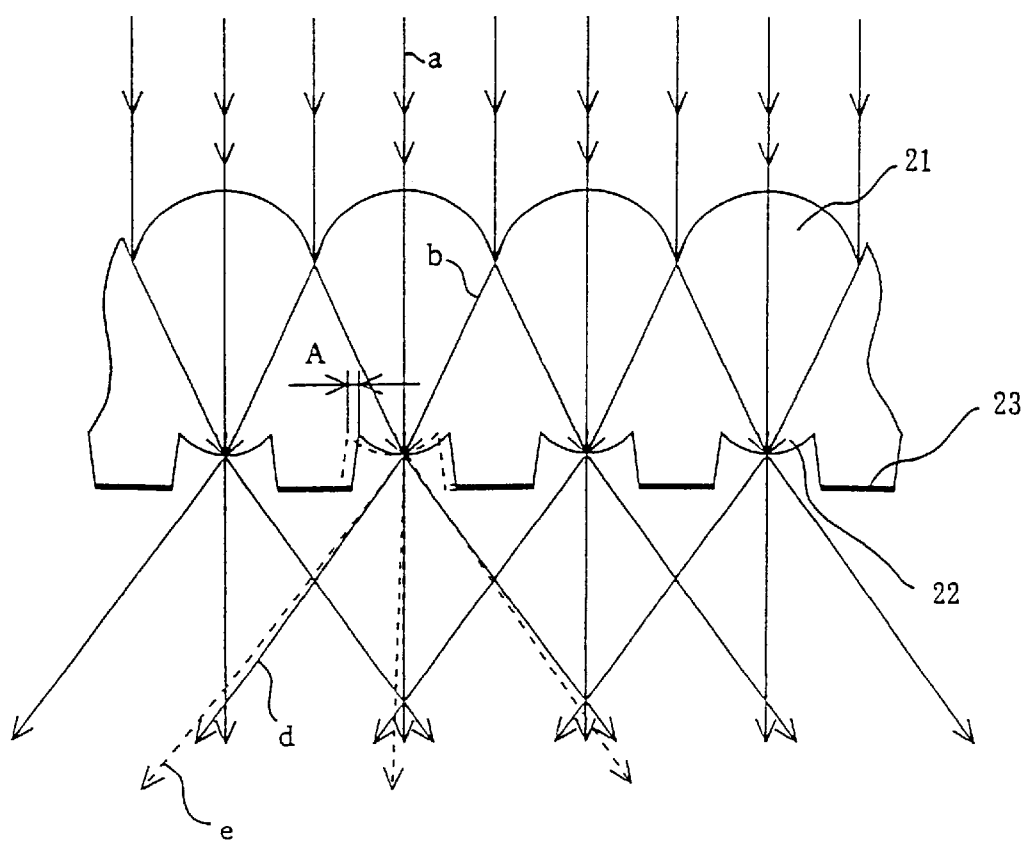
FIG. 8 is an illustration for explanation of light paths upon occurrence of positional deviations at light exit surface-side lenticular lenses in the prior art lenticular lens sheet.

In the way discussed above the exit surface-side lenticular lenses are provided so that these are almost at the focal position of the incidence surface-side lenticular lenses. However, the exit surface-side lenticular lenses can deviate in position along the horizontal direction due to some possible errors in the manufacturing processes thereof (such horizontal deviation of the exit surface-side lenticular lenses due to some causes including errors during the manufacture will be referred to as the "positional deviation" hereinafter). Some exemplary light paths upon occurrence of such positional deviation are shown in FIG. 8 (in FIG. 8, it is assumed that the exit surface-side lenticular lenses are at a position designated by dotted lines as a result of position shift by a length "A" from its inherently expected position (denoted by solid lines in the drawing) as has been determined by a design choice). When one or more exit surface-side lenticular lenses are shifted from their design-determined position, those rays of light which are collected by the incidence surface-side lenticular lenses 21 to arrive at the exit surface-side lenticular lenses 22 behave to outgo in a direction that is different from the "correct" direction in which light is inherently expected to travel outwardly (rays "e"). When the light rays exiting in such different direction are seen from viewers or observers, the resulting pattern of brightness and darkness can be observed as vertical non-uniform lines on the display screen.

The positional deviation of the lenticular lenses can take place mainly due to errors during manufacture of a molding structure employed for extrude-fabrication. Possible positional deviation is determinable depending upon the fabrication accuracy during mechanical machining of such mold structure, which would result in difficulty or incapability of decreasing such deviation so as to be less than the allowable tolerance of about ±3 μm with the design value midway therebetween, as far as currently available machining architectures are employed therefor. Assuming that the machining tolerance of such degree occurs, the ratio of the amount of positional deviation to the lens pitch remains less when the lenticular lenses are greater in pitch; however, the less the lens pitch, the more the affection of such positional deviation, which in turn leads to an increase in risk of observability of unwanted vertical on-display non-uniform line patterns. Insofar as the machining accuracy remains equivalent to ±3 μm or therearound, "crisp" non-uniform vertical lines take place at lenticular lens sheets that are less than or equal to 0.5 mm in lens pitch.

Next, the reason why such non-uniform vertical line patterns may be avoidable by use of the lenticular lens sheet embodying the invention. As shown in FIG. 2, this lenticular lens sheet is specifically designed in a way such that certain surface portions at or near the focal points of incidence surface-side lenticular lenses 8 are made substantially flat defining flat surface components 9. Accordingly, even where the exit surface-side pattern is horizontally deviated or shifted from the design value due to machining errors, the angle of those rays b entering the exit surface is kept unchanged permitting rays c to remain constant in exit angle from the substantially flat surfaces 9 on the exit surface side. This may advantageously serve to eliminate, or at least greatly suppress, presence of light rays that badly behave to outgo in unexpected directions angularly different from the inherent travel direction as defined by a design choice, whereby no alternate brightness/darkness patterns of light rays occur so that no vertical non-uniform lines take place any more.

One exemplary optical simulation result by well-known ray tracing techniques will now be presented for demonstration of the technical advantage of the invention. See FIG. 3, which is a graph showing an experimentation result representative of the relation of the magnitude of positional deviations (mm) occurred at the exit surface-side lenticular lenses versus the exit angle of peak exit rays externally leaving the lenticular lens sheet employed. Here, the term "peak exit rays" as used herein may refer to those light components progressing in a selected direction offering the highest intensity or luminance, whereas the term "exit angle" refers to an angle with a specifically calculated value at which rays vertically falling onto the lenticular lens sheet behave to outgo after passing through the incidence surface-side lenticular lenses and exit surface-side lenticular lenses under the assumption that the direction normal to such lenticular lens sheet is 0°.

Figure 3:
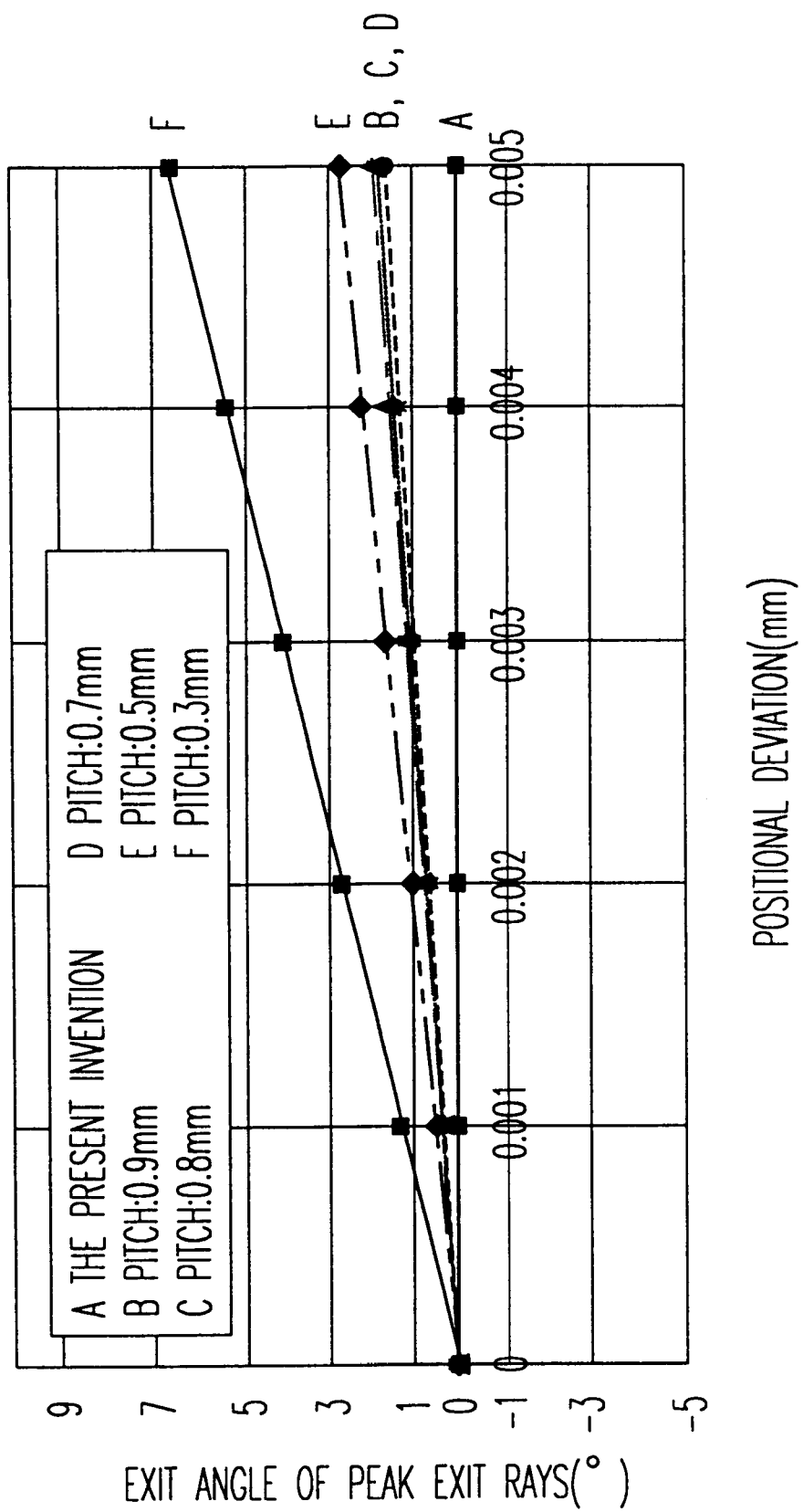
FIG. 3 is a diagram demonstrating based on experimental calculations a relation of the magnitude of positional deviation occurred in a light exit surface lenticular lens versus the exit angle of peak exit ray outgoing from the lenticular lens sheet.

In FIG. 3, reference character "A" designates the lenticular lens sheet embodying the principles of the invention. Other characters "B" to "F" are also used herein to indicate certain lenticular lens sheets each having two opposite sets of lenticular lenses provided on the conventional exit surface side and incidence surface side, respectively, in a way such that these sheets are different in lens pitch from one another as shown herein. As apparent from the graph of FIG. 3, in the lenticular lens sheet having lenticular lens sets on the sides of the conventional exit and incidence surfaces respectively, the less the lens pitch, the greater the affection of positional deviations with respect to the peak exit angle. One example is that where the pitch is 0.3 mm, a change in peak exit angle might appear measuring approximately 4° upon occurrence of a deviation of ±3 μm. This acts as the cause of non-uniform vertical line patterns on the display screen.

In contrast thereto, it may be well demonstrated by the characteristic curve "A"—this indicates a simulation result about the lenticular lens sheet embodying the present invention—that no changes in peak exit angle occurred in any way thus guaranteeing successful elimination of any non-uniform vertical line patterns almost completely. Note here that as readily understandable by viewing the graph of FIG. 3, the advantage of the invention may be maximized especially where the lens pitch of lenticular sheet is decreased in view of the fact that the conventional lenticular lens sheets are as small as 0.5 mm or less in lens pitch by way of example, leading to the risk that a relatively significant change can arise in exit angle of peak exit ray.

Figure 4:
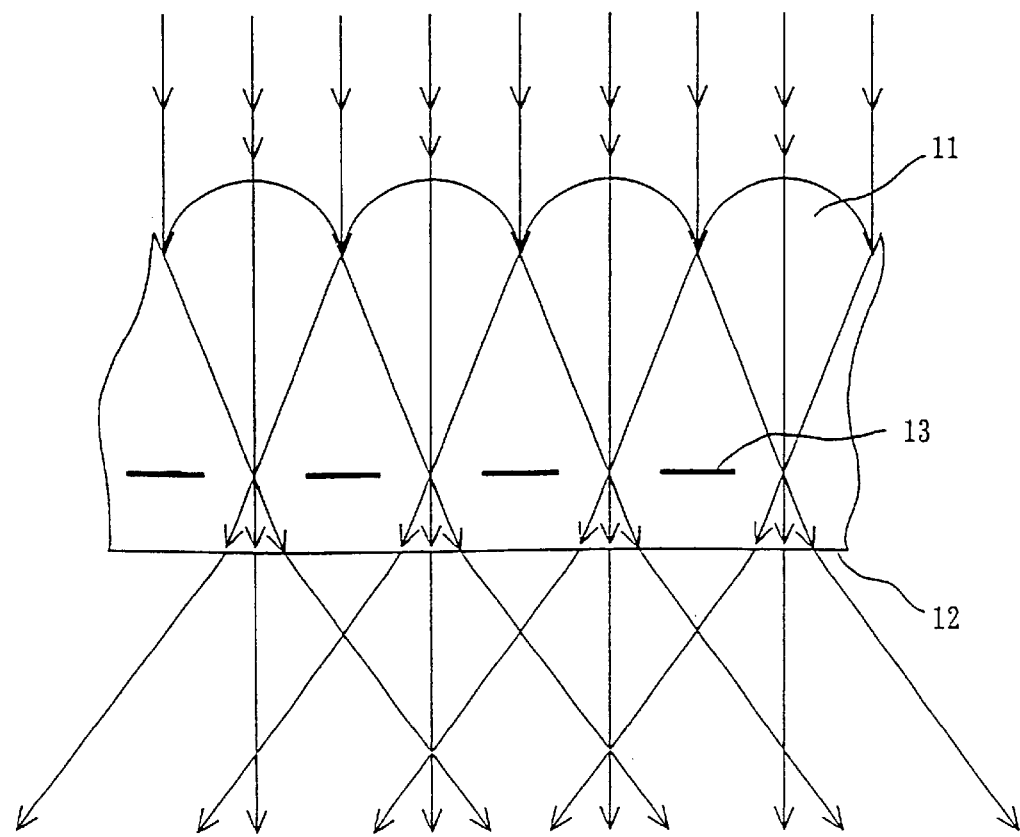
FIG. 4 is a diagrammatic representation of another exemplary configuration of a lenticular lens sheet used in the apparatus of the invention along with a depiction of several major light paths.

Turning to FIG. 4, a configuration of a lenticular lens sheet in accordance with another embodiment of the invention is shown along with its several light paths. As shown, the lenticular lens sheet has its light incidence surface on which lenticular lenses 11 are provided, and a light exit surface 12 that is flat in the entire area thereof. Light absorption layer components 13 are embedded in the sheet at selected locations thereof, each of which locations is out of those part through which rays of light attempt to pass.

Figure 5:
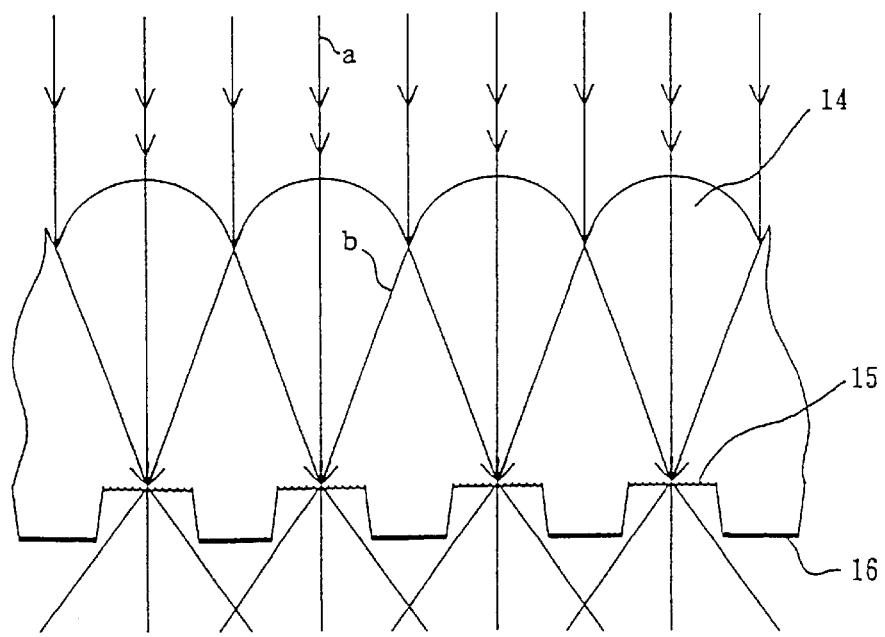
FIG. 5 is an illustration of a still another exemplary configuration of a lenticular lens sheet used in the invention along with several major light paths.

See FIG. 5. This depicts a configuration of a lenticular lens sheet in accordance with a still another embodiment of the invention along with several major light paths associated therewith. In this lenticular lens sheet micro-lenticular lenses 15 having a periodical structure in the same direction as that of incidence surface-side lenticular lenses 14 are provided in each of the substantially flat surface portions at or near the focal position of incidence surface-side lenticular lenses 14. As shown in FIG. 5, provision of such micro-lenticular lenses 15 may enable rays a as projected from the incidence surface side and then collected by the incidence surface-side lenticular lenses 14 (rays b) to be widely diffused by micro-lenticular lenses 15 in the horizontal direction when leaving the exit surface outwardly (rays c). In the prior art lenticular lens sheets the exit surface-side lenticular lenses exhibit capability of eliminating color deviations while at the same time offering the effect of forcing rays to diffuse widely in the horizontal direction. The micro-lenticular lenses 15 may be functionally equivalent to those lenticular lenses on the exit side of such conventional lenticular lens sheets in that light rays are allowed to widely diffuse horizontally. These micro-lenticular lenses may be 0.03 to 0.1 mm in pitch, and 0.003 to 0.03 mm in lens height as discussed supra. Light absorption layer stripes 16 are formed at certain portions of the light exit surface with no micro-lenticular lenses 15 provided thereon.

It should be noted that as has been stated previously, any prior known lenticular lens sheets are encountered with a problem in that a decrease in pitch of light incidence surface-side lenticular lens sheet leads to the need for reducing the sheet thickness, which would result in a decrease in mechanical strength or stiffness; the lenticular lens sheet embodying the invention, by contrast, may enable accomplishment of wide horizontal view angles which are essentially equivalent to those of the conventional lenticular lens sheets, by appropriately designing the pitch and height values of micro-lenticular lenses so as to fall within the aforesaid range in conformity with a view angle required on a case-by-case basis. And, in the case of the lenticular lens sheet incorporating the principles of the invention, the sheet thickness may be appropriately determinable in a way independent of the pitch of light-incidence surface-side lenticular lenses, allowing system designers to select a proper sheet thickness which results in sufficiently enhanced mechanical strength as needed.

Figure 6:
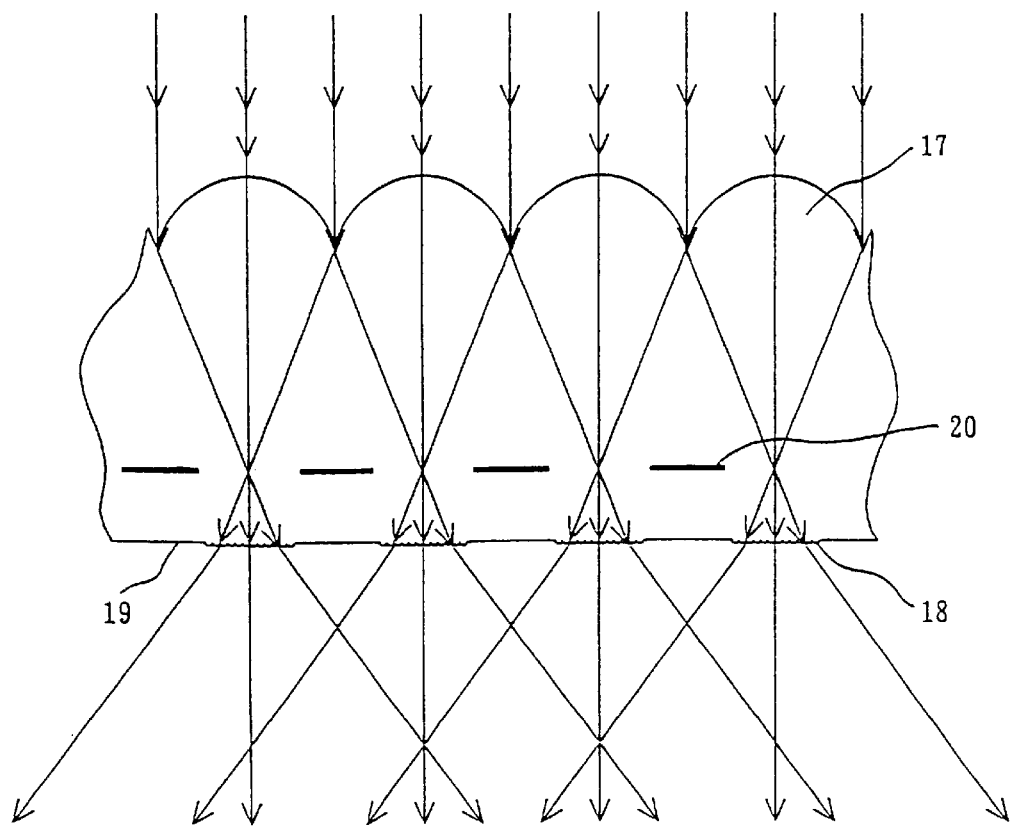
FIG. 6 is a depiction of a further exemplary configuration of a lenticular lens sheet used in the invention along with several major light paths.

Referring to FIG. 6, a lenticular lens sheet in accordance with a further embodiment of the invention is shown in enlarged schematic cross-section along with major light paths associated therewith. The lenticular lens sheet shown in FIG. 6 has its light incidence surface on which lenticular lenses 17 are provided while also providing micro-lenticular lenses 18 at or near the focal position of incidence surface-side lenticular lenses 17 with certain light-exit surface portions made flat which are other than those having micro-lenticular lenses 18 thereon. Light absorption layer components 20 are provided at specific locations inside the screen, through which components no rays of light pass.

Additionally, in the prior art rear projection image display apparatus employing a three-tube CRT, it has been required that an extra surface configuration defining a lens pattern be also provided on the light-exit surface in order to eliminate appearance of viewable color deviations otherwise occurring on the display screen due to projection of red (R) and blue (B) components of light rays from the CRT in diagonal directions with respect to the lenticular lenses. However, in those screens for use with projector devices of the type which have periodical pixel structures, such as liquid crystal displays, no rays are to be projected in such diagonal directions whereby no color deviations are visible even where any lenses are not preformed on the light exit surface.

One significant advantage of the present invention lies in capability of eliminating, or at least greatly suppressing, occurrence of any vertical on-screen non-uniform line patterns conventionally occurrable in image display apparatus with projector devices having the pixel structures in the horizontal direction, such as liquid crystal display panels, DMDs, or the like. Another advantage of the invention is that the above effect may be maximized especially when the lenticular lens sheet used remains smaller in lens pitch to measure 0.5 mm or less by way of example. A further advantage is that with the lenticular lens sheet embodying the invention, its sheet thickness may be determinable regardless of the pitch of light-incidence surface-side lenticular lenses thereby enabling appropriate settings of the sheet thickness to ensure that sufficient mechanical strength is attainable as necessary.

Although the invention has been disclosed and illustrated with reference to a particular embodiment, the principles involved are susceptible for use in numerous other embodiments which will be apparent to persons skilled in the art. The invention is, therefore, to be limited only as indicated by the scope of the appended claims.

What is claimed is:

1. A rear projection image display apparatus comprising:
   a screen comprising a lenticular lens sheet including,
      a light incidence surface with lenticular lenses periodically provided thereon,
      a light exit surface including a plurality of flat surfaces and a plurality of light absorption portions, wherein each flat surface is located at or near a predetermined distance from a respective lenticular lens which corresponds to a focal position of the respective lenticular lens, each light absorption portion is located a distance from the lenticular lens sheet which corresponds to a non-focal position, and the plurality of flat surfaces and the plurality of light absorption portions are alternately provided along the light exit surface,
   micro-lenticular lenses including a periodical structure, and provided on each flat surface in the same direction as that of the lenticular lens sheet on the light incidence surface; and
   a projector device having a periodical pixel structure configured to project an image onto said screen.

2. The apparatus of claim 1, wherein the micro-lenticular lens ranges from 0.03 to 0.1 mm in pitch and ranges in lens height from 0.003 to 0.03 mm.

* * * * *